United States Patent
Kwok et al.

(10) Patent No.: US 7,236,219 B2
(45) Date of Patent: Jun. 26, 2007

(54) COLOR TWISTED NEMATIC LIQUID CRYSTAL DISPLAYS

(75) Inventors: Hoi-Sing Kwok, Kowloon (HK); Xing-Jie Yu, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 120 days.

(21) Appl. No.: 10/722,547

(22) Filed: Nov. 28, 2003

(65) Prior Publication Data

US 2005/0117091 A1    Jun. 2, 2005

(51) Int. Cl.
*G02F 1/1335* (2006.01)
*C09K 19/02* (2006.01)

(52) U.S. Cl. .................. 349/99; 349/180; 349/181
(58) Field of Classification Search .................. 349/99
See application file for complete search history.

(56) References Cited

U.S. PATENT DOCUMENTS

| 4,896,947 A | * | 1/1990 | Leenhouts | ............... 349/99 |
| 4,909,603 A | * | 3/1990 | Taniguchi | ............... 349/103 |
| 5,182,664 A | * | 1/1993 | Clerc | ............... 349/33 |
| 5,982,463 A | | 11/1999 | Yamaguchi et al. | |
| 6,067,136 A | | 5/2000 | Yamaguchi et al. | |
| 6,295,113 B1 | * | 9/2001 | Yang | ............... 349/179 |

\* cited by examiner

*Primary Examiner*—David Nelms
*Assistant Examiner*—Michael H. Caley
(74) *Attorney, Agent, or Firm*—Buchanan Ingersoll & Rooney PC

(57) ABSTRACT

The present invention relates to color liquid crystal displays without the use of color filters. By carefully choosing the design parameters of a liquid crystal display, it is possible to obtain vivid colors from the display as a function of the operating voltage.

4 Claims, 11 Drawing Sheets

US 7,236,219 B2

COLOR TWISTED NEMATIC LIQUID CRYSTAL DISPLAYS

FIELD OF THE INVENTION

This invention relates to novel designs for color twisted nematic liquid crystal displays.

BACKGROUND OF THE INVENTION

Color liquid crystal displays (LCDs) are usually made by putting color filters onto the individual pixels of a liquid crystal display. These color filters are resins with color pigments. Full color displays can be made by a combination of the red, green and blue primary colors. This coloring scheme is the predominant technology for active matrix as well as passive matrix LCDs currently in use. Many colors can be obtained.

For many applications, multiple colors rather than a full range of colors may be sufficient. This is especially true for low cost products not requiring full video displays. There have been several proposals to produce a color effect without the use of color filters. The advantages of colors without color filters are many, the most important one being cost and ease of manufacturing. Yamaguchi et al, Yamaguchi et al and Yang et al teach the generation of color by the addition of a birefringent film inside the LCD. The birefringence color is due to the interference effect and dispersion effect of the transmission of the LC cell. While most of the attention is concentrated on the supertwisted nematic (STN) display with a twist angle of larger than 180°, there is nevertheless a need for similar techniques for low twist angles. Such displays have not been studied systematically.

SUMMARY OF THE INVENTION

The present invention provides a proper set of values for the twist angle, the cell birefringence and the input/output polarizer angles, from which it is possible to obtain vivid colors in low twist LCDs without the use of color filters. Such displays have many applications in situations requiring only a few colors without gray scales.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
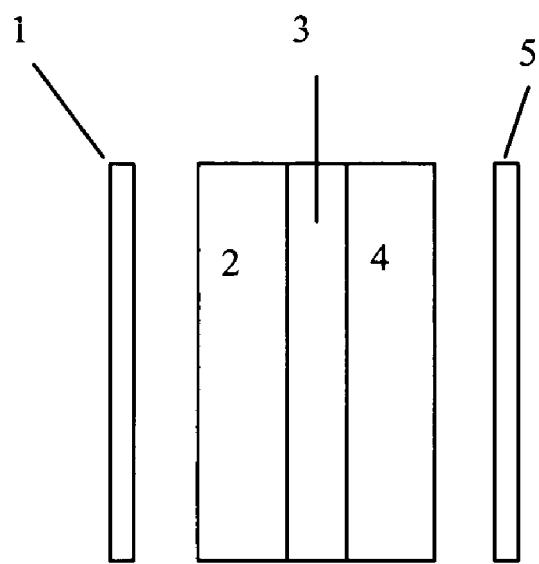
FIG. 1 is a schematic diagram of a transmittive LCD cell.
Figure 2:
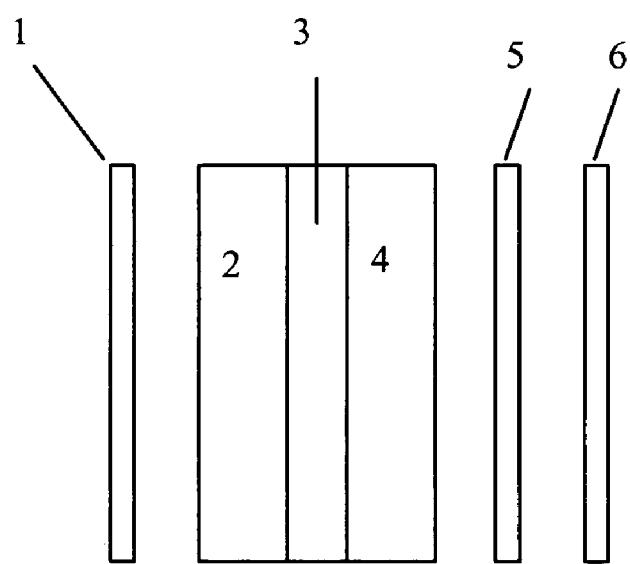
FIG. 2 is a schematic diagram of a transflective LCD cell.
Figure 3:
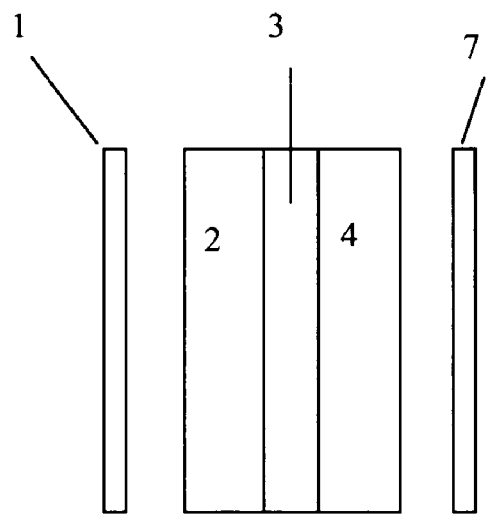
FIG. 3 is a schematic diagram of a reflective LCD cell.

A liquid crystal display is composed of a liquid crystal layer 3 and a front polarizer 1. The liquid crystal layer is held between two pieces of glass 2 and 4. On these glasses, there can be conductive transparent electrodes, alignment layers and other coatings necessary for making the display. For a transmittive display, a rear polarizer 5 is added as shown in FIG. 1. For the case of a transflective display, a diffusive reflector 6 can also be added as shown in FIG. 2. In the case of a single polarizer reflective display, the rear polarizer 5 is eliminated as shown in FIG. 3. A special reflector 7, which does not produce any depolarization effect, will then have to be used.

Figure 4:
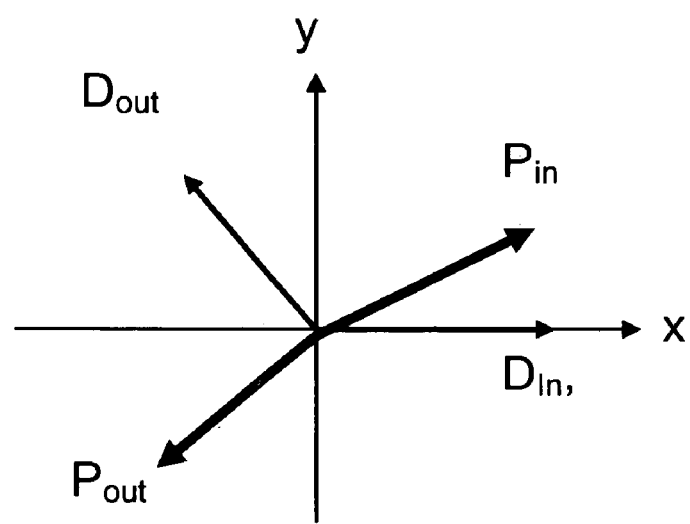
FIG. 4 is a schematic diagram of the various directions and vectors of a LCD cell.

The transmission or reflection properties of a LCD is completely characterized by its input polarizer angle $\alpha$, the cell gap d—birefringence $\Delta n$ product, $d\Delta n$, the twist angle of the liquid crystal $\phi$, and the output polarizer angle $\gamma$. All these angles are measured relative to the input director of the LCD cell which is defined as the x-axis. The various directions inside a LC cell are shown in FIG. 4. The twist angle $\phi$ is the angle between the input and output directors. The input and output polarizers are at angles relative to the input director.

By varying the set of values (α, γ, φ, dΔn) one can obtain any color for the display at the no voltage bias V=0 state. The transmission spectrum is simply given by the Jones matrix calculation $$T = \left| (\cos\gamma \quad \sin\gamma) \cdot M_{LC} \cdot \begin{pmatrix} \cos\alpha \\ \sin\alpha \end{pmatrix} \right|^2 \quad (1)$$

where $M_{LC} = \begin{pmatrix} A - iB & -C - iD \\ C - iD & A + iB \end{pmatrix}$ (2)

and $$A = \cos\phi\cos\chi + \frac{\phi}{\chi}\sin\phi\sin\chi \quad (3)$$

$$B = \frac{\delta}{\chi}\cos\phi\sin\chi \quad (4)$$

$$C = \sin\phi\cos\chi - \frac{\phi}{\chi}\cos\phi\sin\chi \quad (5)$$

$$D = \frac{\delta}{\chi}\sin\phi\sin\chi \quad (6)$$

and $$\chi = (\delta^2 + \phi^2)^{1/2} \quad (7)$$

$$\delta = \pi d\Delta n/\lambda \quad (8)$$

$$\Delta n = n_e(\theta) - n_o \quad (9)$$

where λ is the wavelength. By varying the parameters (α, γ, φ, dΔn), combinations can be found that will produce color LCDs without requiring any color filters. The search can then be further refined by applying a voltage to the LCD and finding its color change. This requires the calculation of the deformation of the liquid crystal director arrangement by solving the Euler-Lagrange equations. In the optimization procedure, the deformation of the liquid crystal alignment may be calculated as a function of applied voltage. Then the transmission spectra as a function of the applied voltage are calculated. The results are evaluated in terms of its colors. Finally, several modes where the color changes are vividly obtained as a function of applied voltage are recorded.

For the case of the single polarizer reflective display, the reflectivity is given by $$R = \left| (\cos\alpha \quad \sin\alpha) \cdot R_\phi M_{LC}^* R_\phi^{-1} M_{LC} \cdot \begin{pmatrix} \cos\alpha \\ \sin\alpha \end{pmatrix} \right|^2$$

where the transformation matrix R is given by $$R_\phi = \begin{pmatrix} \cos\phi & -\sin\phi \\ \sin\phi & \cos\phi \end{pmatrix}$$

The same procedure of varying (α, φ, dΔn) to find the best combination with the best colors can be performed as in the transmittive display. For the reflective display, the search is simpler because of the reduction of one variable. All the new combinations of (α, φ, dΔn) are recorded here.

In its preferred embodiments the present invention provides values of (α, γ, φ, dΔn) for obtaining vivid color LCDs without using color filters. These results can be generalized into several categories.

In the first category, the background of the display is yellowish green or light colors. This is the color of the display without an applied voltage or before the applied voltage affects the liquid crystal alignment. The other colors such as purple, blue, red, orange are obtained by applying a higher voltage. Within this group, the value of can take on 2 values depending on the brightness contrast required. In general, for this group of displays, the following rules are obeyed:

α~45°
γ~135°−φ
φ can be any value
dΔn~1.3 μm or 0.79 μm

In the second group of displays, the background of the display is light yellow. This is the color of the display without an applied voltage or before the applied voltage affects the liquid crystal alignment. The other colors such as purple, blue, red, orange are obtained by applying a higher voltage. In general, for this group of displays, the following rules are obeyed:

α~45°
γ~45°−φ
φ can be any value
dΔn~1.1 μm

Figure 5:
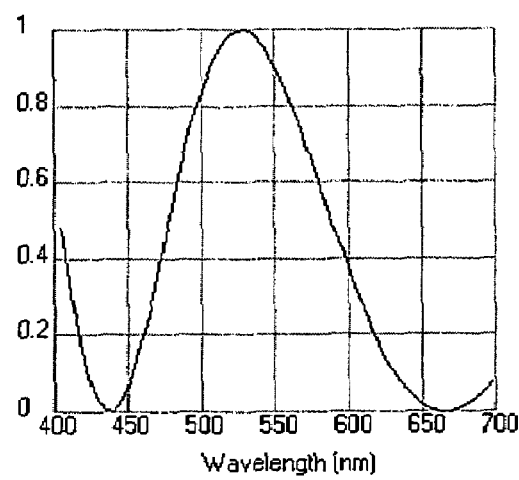
FIG. 5 is the transmission spectrum of the zero volt state of the first preferred embodiment.
Figure 6:
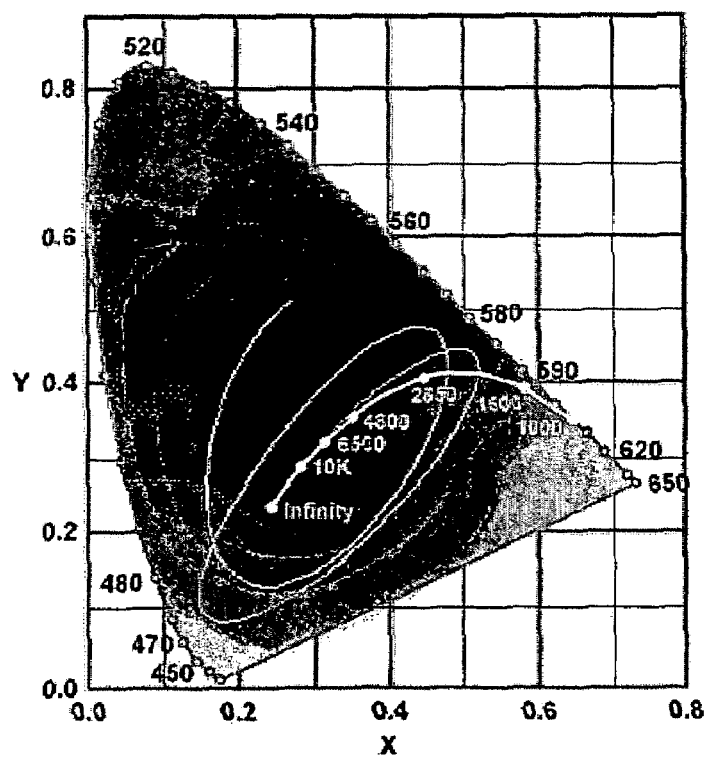
FIG. 6 is the color coordinate of the liquid crystal display output of the first preferred embodiment as the voltage is changed.

In the third category, the display is of a single polarizer reflective type. In this case, the general rules discovered are α~45°
φ can be any value smaller than 60°
dΔn~0.5-0.6 μm In the first preferred embodiment of this invention, the LCD is of a transmittive type. The (α, γ, φ, dΔn) values are (45°, 30°, 75°, 1.3 μm). The transmission spectrum of this display can be calculated using equation (1). The result is shown in FIG. 5. This display is green when the applied voltage is zero. When a voltage bias is applied, the color will change to blue, purple, yellow, orange, pink and other colors depending on the voltage. FIG. 6 shows the trajectory of the color coordinates in the CIE (Commission International de l'Eclairage) chart when the applied voltage is varied.

Figure 7:
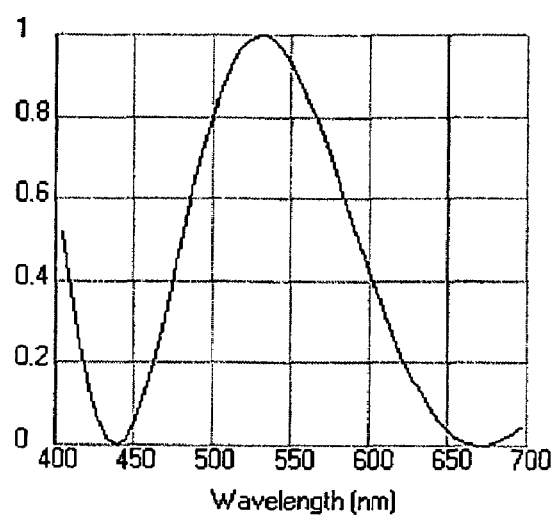
FIG. 7 is the transmission spectrum of the zero volt state of the second preferred embodiment.
Figure 8:
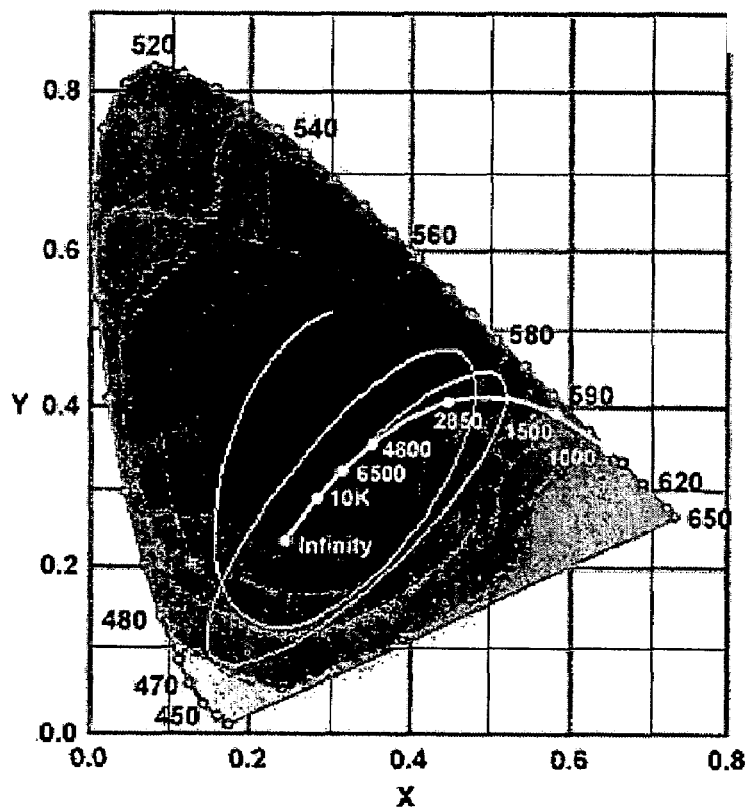
FIG. 8 is the color coordinate of the liquid crystal display output of the second preferred embodiment as the voltage is changed.

In the second preferred embodiment of this invention, the LCD is of a transmittive type. The (α, γ, φ, dΔn) values are (45°, 45°, 90°, 1.3 μm). The transmission spectrum of this display can be calculated using equation (1). The result is shown in FIG. 7. This display is green when the applied voltage is zero. When a voltage bias is applied, the color will change to blue, purple, yellow, orange, pink and other colors depending on the voltage. FIG. 8 shows the trajectory of the color coordinates in the CIE chart when the applied voltage is varied.

Figure 9:
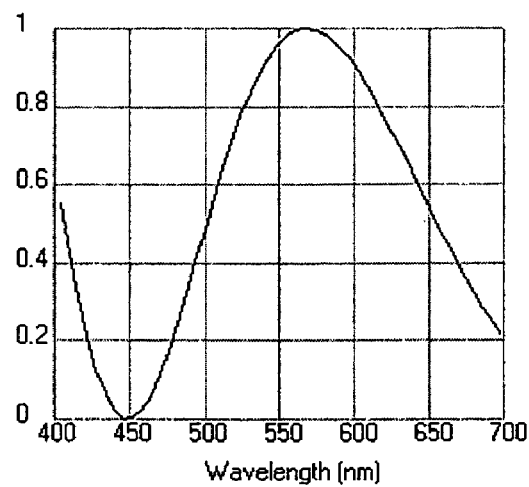
FIG. 9 is the transmission spectrum of the zero volt state of the third preferred embodiment.
Figure 10:
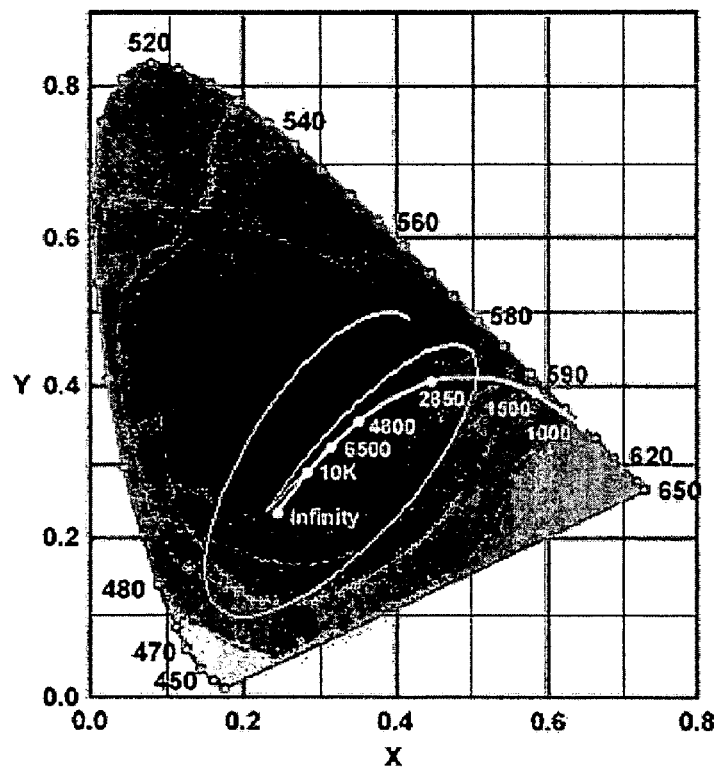
FIG. 10 is the color coordinate of the liquid crystal display output of the third preferred embodiment as the voltage is changed.

In the third preferred embodiment of this invention, the LCD is of a transmittive type. The (α, γ, φ, dΔn) values are (45°, −45°, 90°, 1.1 μm). The transmission spectrum of this display can be calculated using equation (1). The result is shown in FIG. 9. This display is yellow when the applied voltage is zero. When a voltage bias is applied, the color will change to blue, purple, yellow, orange, pink and other colors depending on the voltage. FIG. 10 shows the trajectory of the color coordinates in the CIE chart when the applied voltage is varied.

Figure 11:
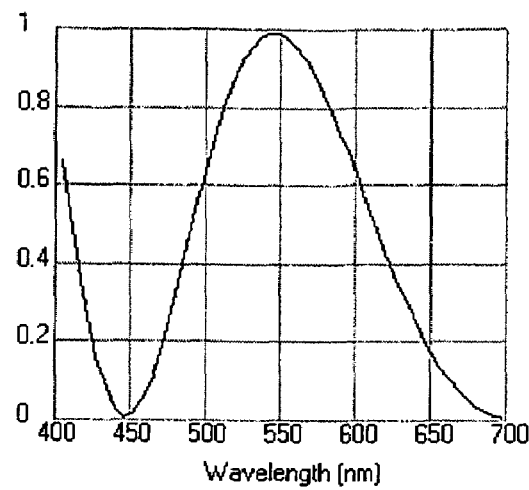
FIG. 11 is the transmission spectrum of the zero volt state of the fourth preferred embodiment.
Figure 12:
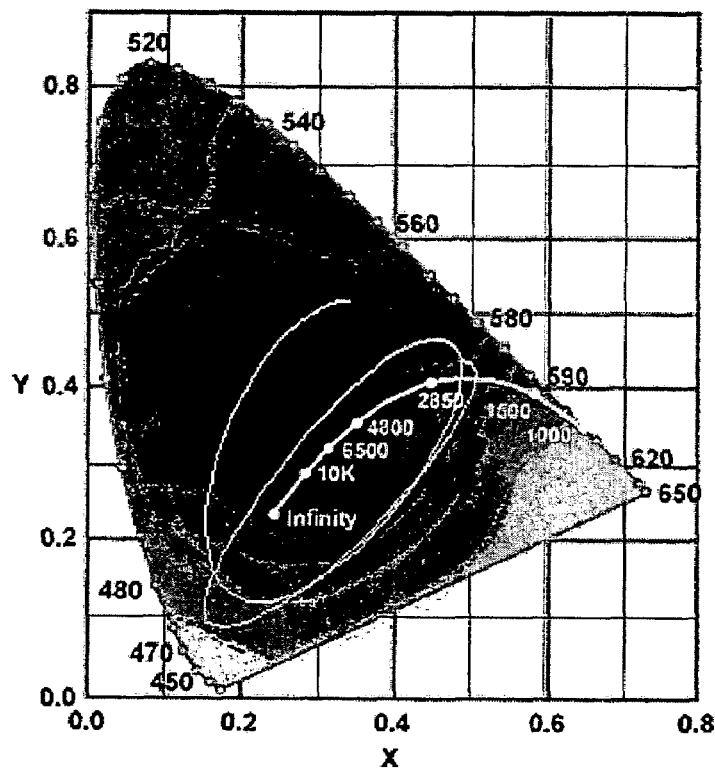
FIG. 12 is the color coordinate of the liquid crystal display output of the fourth preferred embodiment as the voltage is changed.

In the fourth preferred embodiment of this invention, the LCD is of a transmittive type. The (α, γ, φ, dΔn) values are (45°, 90°, 130°, 1.3 μm). The transmission spectrum of this display can be calculated using equation (1). The result is shown in FIG. 11. This display is yellowish green when the applied voltage is zero. When a voltage bias is applied, the color will change to blue, purple, yellow, orange, pink and other colors depending on the voltage. FIG. 12 shows the trajectory of the color coordinates in the CIE chart when the applied voltage is varied.

Figure 13:
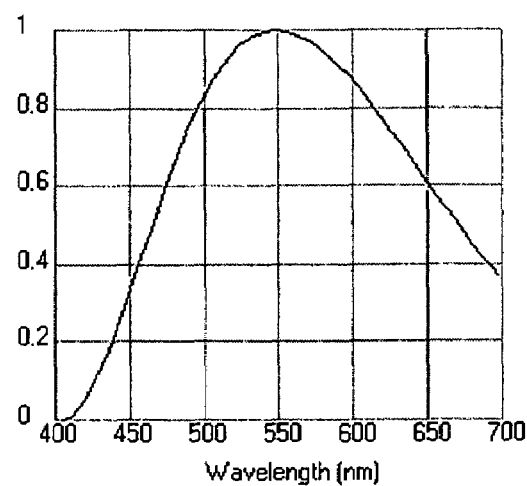
FIG. 13 is the transmission spectrum of the zero volt state of the fifth preferred embodiment.
Figure 14:
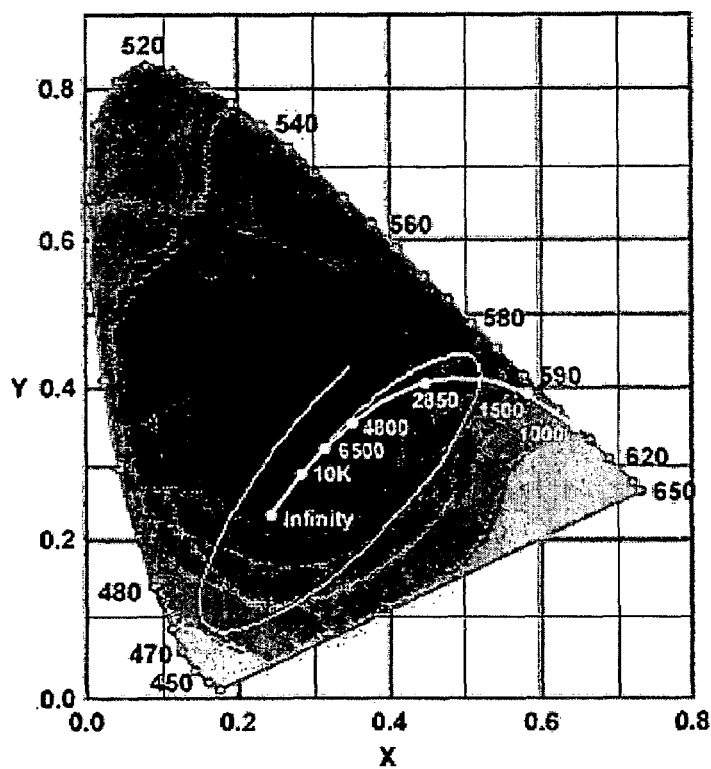
FIG. 14 is the color coordinate of the liquid crystal display output of the fifth preferred embodiment as the voltage is changed.

In the fifth preferred embodiment of this invention, the LCD is of a transmittive type. The ($\alpha$, $\gamma$, $\phi$, d$\Delta$n) values are (45°, 30°, 75°, 0.79 µm). The transmission spectrum of this display can be calculated using equation (1). The result is shown in FIG. 13. This display is green when the applied voltage is zero. When a voltage bias is applied, the color will change to blue, purple, yellow, orange, pink and other colors depending on the voltage. FIG. 14 shows the trajectory of the color coordinates in the CIE chart when the applied voltage is varied. This is actually similar to the first preferred embodiment except for a lower value of d$\Delta$n.

Figure 15:
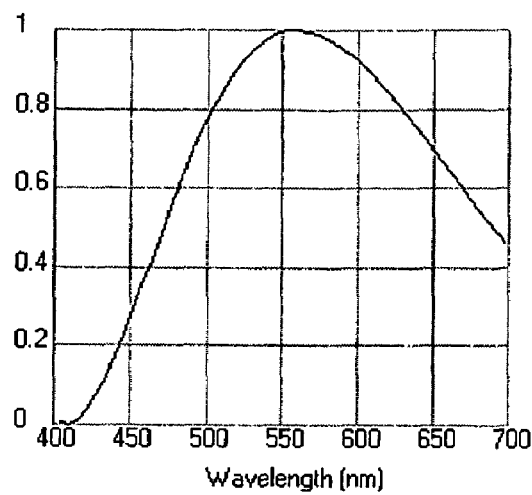
FIG. 15 is the transmission spectrum of the zero volt state of the sixth preferred embodiment.
Figure 16:
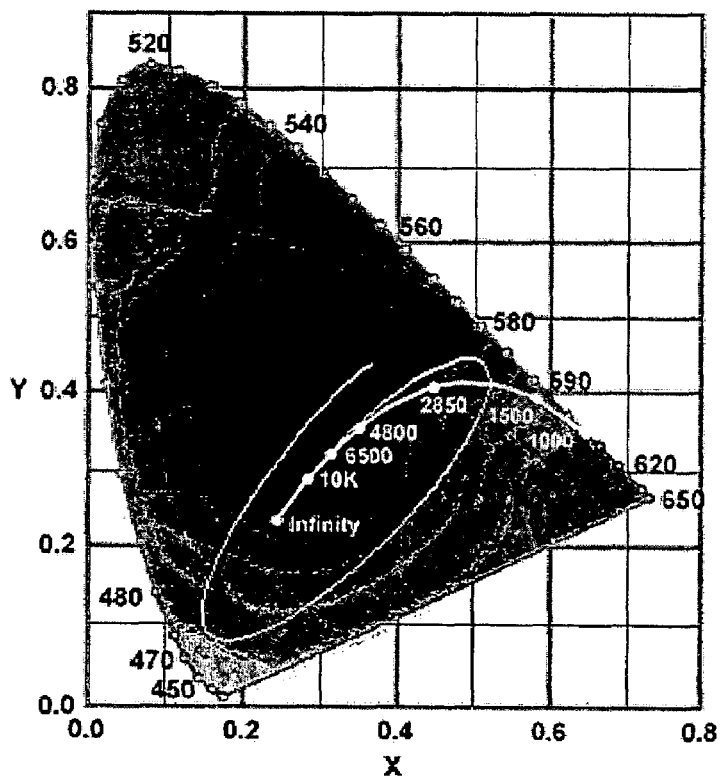
FIG. 16 is the color coordinate of the liquid crystal display output of the sixth preferred embodiment as the voltage is changed.

In the sixth preferred embodiment of this invention, the LCD is of a transmittive type. The ($\alpha$, $\gamma$, $\phi$, d$\Delta$n) values are (45°, 45°, 90°, 0.79 µm). The transmission spectrum of this display can be calculated using equation (1). The result is shown in FIG. 15. This display is green when the applied voltage is zero. When a voltage bias is applied, the color will change to blue, purple, yellow, orange, pink and other colors depending on the voltage. FIG. 16 shows the trajectory of the color coordinates in the CIE chart when the applied voltage is varied. This is actually similar to the second preferred embodiment except for a lower value of d$\Delta$n.

Figure 17:
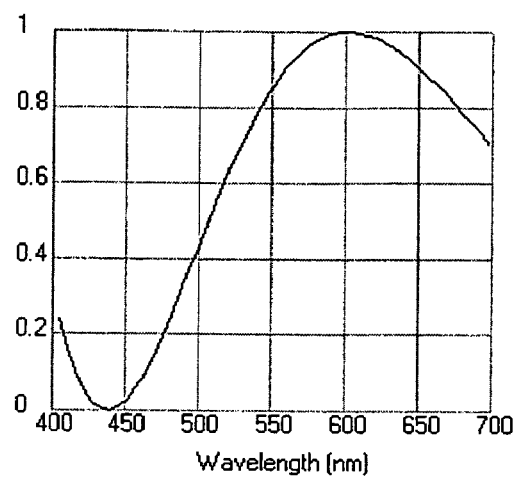
FIG. 17 is the transmission spectrum of the zero volt state of the seventh preferred embodiment.
Figure 18:
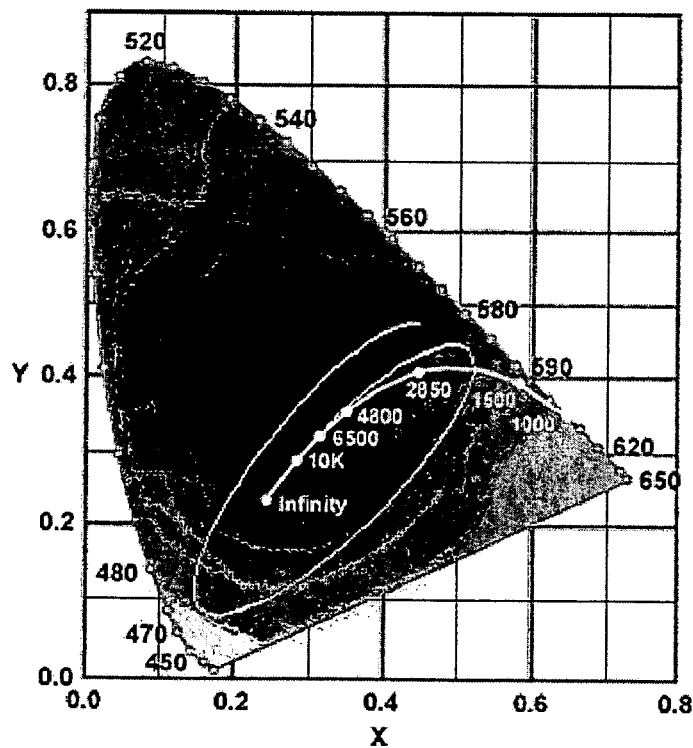
FIG. 18 is the color coordinate of the liquid crystal display output of the seventh preferred embodiment as the voltage is changed.

In the seventh preferred embodiment of this invention, the LCD is of a transmittive type. The ($\alpha$, $\gamma$, $\phi$, d$\Delta$n) values are (45°, 45°, 90°, 0.85 µm). The transmission spectrum of this display can be calculated using equation (1). The result is shown in FIG. 17. This display is yellow when the applied voltage is zero. When a voltage bias is applied, the color will change to blue, purple, yellow, orange, pink and other colors depending on the voltage. FIG. 18 shows the trajectory of the color coordinates in the CIE chart when the applied voltage is varied. This is actually similar to the third preferred embodiment except for a lower value of d$\Delta$n.

Figure 19:
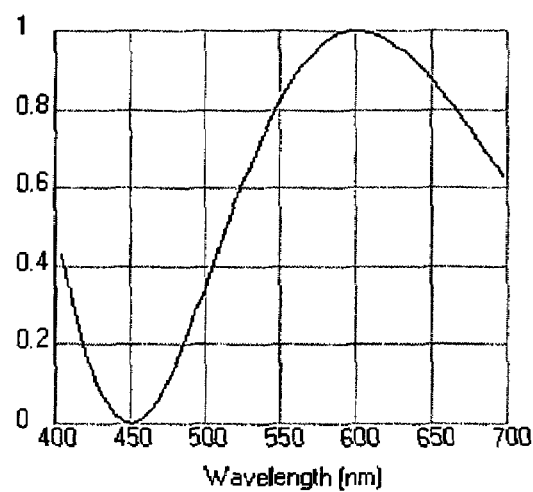
FIG. 19 is the transmission spectrum of the zero volt state of the eighth preferred embodiment
Figure 20:
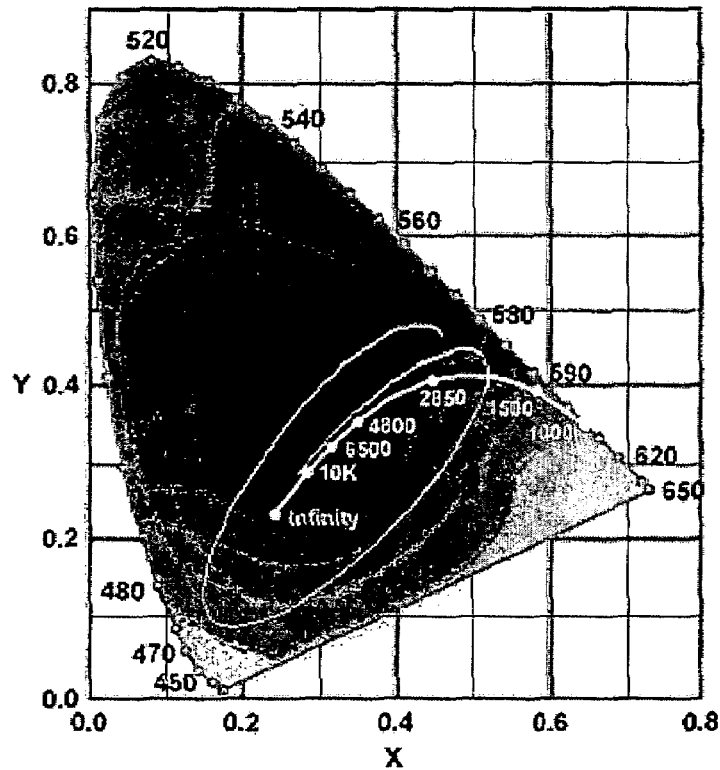
FIG. 20 is the color coordinate of the liquid crystal display output of the eighth preferred embodiment as the voltage is changed.

In the eighth preferred embodiment of this invention, the LCD is of a transmittive type. The ($\alpha$, $\gamma$, $\phi$, d$\Delta$n) values are (45°, −45°, 5°, 0.9 µm). The transmission spectrum of this display can be calculated using equation (1). The result is shown in FIG. 19. This display is yellow when the applied voltage is zero. When a voltage bias is applied, the color will change to blue, purple, yellow, orange, pink and other colors depending on the voltage. FIG. 20 shows the trajectory of the color coordinates in the CIE chart when the applied voltage is varied. This is actually similar to the third preferred embodiment except for a lower value of d$\Delta$n.

Figure 21:
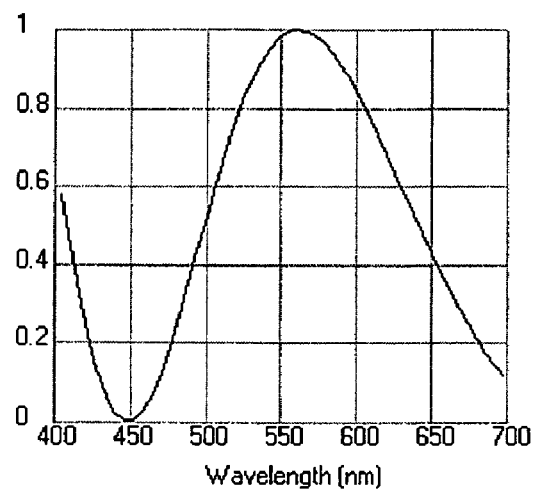
FIG. 21 is the transmission spectrum of the zero volt state of the ninth preferred embodiment.
Figure 22:
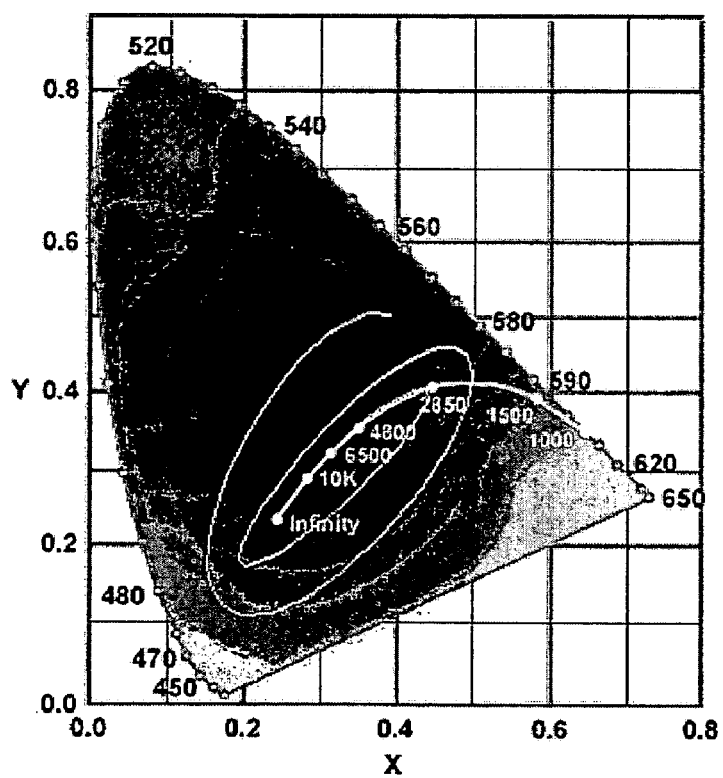
FIG. 22 is the color coordinate of the liquid crystal display output of the ninth preferred embodiment as the voltage is changed.

In the ninth preferred embodiment of this invention, the LCD is of a reflective type. The ($\alpha$, $\phi$, d$\Delta$n) values are (45°, 10°, 0.56 µm). The transmission spectrum of this display can be calculated using equation (1). The result is shown in FIG. 21. This display is yellow when the applied voltage is zero. When a voltage bias is applied, the color will change to blue, purple, yellow, orange, pink and other colors depending on the voltage. FIG. 22 shows the trajectory of the color coordinates in the CIE chart when the applied voltage is varied. This is actually similar to the third preferred embodiment except for a lower value of d$\Delta$n.

The invention claimed is:

1. A liquid crystal display comprising an input polarizer, an output polarizer, and a liquid crystal cell in between said input and output polarizers characterized by a twist angle, a cell thickness and a birefringence of the liquid crystal, such that
   (a) the input polarizer angle $\alpha$ is between 35° and 55° relative to the input director of the said liquid crystal cell,
   (b) the output polarizer angle $\gamma$ is at an angle of the twist angle of the said liquid crystal cell minus 45°, and
   (c) the product of the cell gap d and birefringence $\Delta$n has a value of between 0.9 and 1.3 microns.

2. A liquid crystal display comprising an input polarizer, an output polarizer, and a liquid crystal cell in between said input and output polarizers characterized by a twist angle, a cell thickness and a birefringence of the liquid crystal, such that
   (a) the input polarizer angle $\alpha$ is between 35° and 55° relative to the input director of the said liquid crystal cell,
   (b) the twist angle of the said liquid crystal cell is between 65° and 85°,
   (c) the output polarizer angle $\gamma$ is between 20° and 40° relative to the input director of the said liquid crystal cell, and
   (d) the product of the cell gap d and birefringence $\Delta$n has a value of between 1.1 and 1.5 microns.

3. A liquid crystal display comprising an input polarizer, an output polarizer, and a liquid crystal cell in between said input and output polarizers characterized by a twist angle, a cell thickness and a birefringence of the liquid crystal, such that
   the input polarizer angle is $\alpha \pm N\pi$ where N can be any positive or negative integer and $\alpha$ is between 35° and 55° relative to the input director of the said liquid crystal cell,
   the twist angle of the said liquid crystal cell is between 65° and 85°,
   the output polarizer angle $\gamma$ is between 20° and 40° relative to the input director of the said liquid crystal cell, and
   the product of the cell gap d and birefringence $\Delta$n has a value of between 1.1 and 1.5 microns.

4. A liquid crystal display comprising an input polarizer, an output polarizer, and a liquid crystal cell in between said input and output polarizers characterized by a twist angle, a cell thickness and a birefringence of the liquid crystal, such that
   the input polarizer angle $\alpha$ is between 35° and 55° relative to the input director of the said liquid crystal cell,
   the twist angle of the said liquid crystal cell is between 65° and 85°,
   the output polarizer angle is $\gamma \pm N\pi$ where N can be any positive or negative integer and $\gamma$ is between 20° and 40° relative to the input director of the said liquid crystal cell, and
   the product of the cell gap d and birefringence $\Delta$n has a value of between 1.1 and 1.5 microns.

* * * * *